United States Patent [19]
Anderson et al.

[11] Patent Number: 5,905,834
[45] Date of Patent: May 18, 1999

[54] COMBINATION LOOSE TUBE OPTICAL FIBER CABLE WITH REVERSE OSCILLATING LAY

[75] Inventors: Aaron M. Anderson, Batesburg; John C. Smith, Columbia, both of S.C.

[73] Assignee: Pirelli Cable Corporation, Del.

[21] Appl. No.: 08/897,921

[22] Filed: Jul. 21, 1997

[51] Int. Cl.$^6$ .................................................. G02B 6/44
[52] U.S. Cl. ........................................... 385/111; 385/113
[58] Field of Search ..................................... 385/109–113

[56] References Cited

U.S. PATENT DOCUMENTS

| | | | |
|---|---|---|---|
| 4,078,853 | 3/1978 | Kempf et al. | 350/96.23 |
| 4,230,395 | 10/1980 | Dean et al. | 385/109 |
| 4,272,155 | 6/1981 | Slaughter | 385/111 |
| 4,688,888 | 8/1987 | Kimmich | 385/113 |
| 4,720,164 | 1/1988 | Oestreich . | |
| 4,822,132 | 4/1989 | Oestreich | 350/96.23 |
| 5,247,599 | 9/1993 | Vyas et al. | 385/113 |
| 5,325,457 | 6/1994 | Bottoms, Jr. et al. . | |
| 5,329,606 | 7/1994 | Andreassen . | |
| 5,343,549 | 8/1994 | Navé et al. . | |
| 5,384,880 | 1/1995 | Keller et al. . | |
| 5,448,669 | 9/1995 | Dunn et al. . | |
| 5,463,711 | 10/1995 | Chu . | |
| 5,531,064 | 7/1996 | Sawano et al. . | |
| 5,542,020 | 7/1996 | Horska | 385/112 |

FOREIGN PATENT DOCUMENTS

| | | |
|---|---|---|
| 0438684A2 | 7/1991 | European Pat. Off. . |
| 0853249 | 7/1998 | European Pat. Off. . |
| 2854746 | 6/1979 | Germany . |
| 90031350 | 7/1990 | Germany . |
| 29520915 | 6/1996 | Germany . |
| 2215081 | 9/1989 | United Kingdom ............. G02B 6/44 |

*Primary Examiner*—John D. Lee
*Attorney, Agent, or Firm*—Norris Mc Laughlin & Marcus; L. P. Brooks

[57] ABSTRACT

An optical fiber cable comprises a central tube containing at least one optical fiber, a plurality of outer tubes, each containing at least one optical fiber, and at least two strength members, wherein the outer tubes and strength members are disposed around and in contact with the central tube, the strength members being between intermediate pairs of outer tubes. Preferably, a cord is wound around the outer tubes and strength members to hold them against the outer tube. Preferably, the optical fiber in the central tube is part of an optical fiber ribbon. Preferably, a plurality of individual optical fibers are provided in the outer tubes. The optical fibers are loosely contained within the central and outer tubes. One or several additional tubes containing insulated copper pairs or a coaxial cable may also be provided. Preferably, the cable tubes and the strength members are disposed in a reverse oscillating lay or S-Z fashion around the central tube.

29 Claims, 4 Drawing Sheets

COMBINATION LOOSE TUBE OPTICAL FIBER CABLE WITH REVERSE OSCILLATING LAY

FIELD OF THE INVENTION

This invention relates to optical fiber cables and, more particularly, to multi-purpose optical fiber cables comprising a central tube and a plurality of outer tubes, each of which contain optical fibers, and a supporting system to protect the optical fibers from forces, such as installation forces and thermally induced expansion and contraction of the tubes in which they are contained.

BACKGROUND OF THE INVENTION

Optical fibers are relatively fragile and must be protected during manufacture and installation. A variety of protective measures are therefore provided in cables containing optical fibers. The optical fiber or fibers are typically enclosed in a plastic buffer tube having a bore of a cross-sectional area larger than the cross-sectional area of the fiber or fibers within it. This is referred to as a "loose" configuration. The material of the tube typically has a relatively high temperature coefficient of expansion and a relatively low tensile strength. Frequently, the axial length of the tube is shorter than the linear length of the fibers or ribbons. The tube can move or be flexed a certain degree by external forces or by thermal expansion and contraction, without bending the optical fiber ribbon.

To further resist thermal expansion and contraction, strength members of metal wires, high strength non-metallic rods or fibers, such as glass rods or fibers or aramid in a matrix of resin, can be provided adjacent the tube or tubes containing the optical fibers. See, for example, U.S. Pat. Nos. 5,509,097 and 5,229,851, assigned to the assignee of the present invention.

Strength members have been provided in the outer jacket or sheath to resist pulling, such as pulling which occurs during installation of a cable. Additional layers of materials, such as armoring for crushing and rodent protection, can also be provided. For moisture protection, the tube is typically filled with a water blocking compound which permits the fibers or ribbons to move within the buffer tubes. The water blocking compound may be a gel or grease-like, and non-hygroscopic and/or thixotropic.

Optical fiber cables are available in a variety of configurations. For example, optical fiber cables are available comprising one or more optical fibers, an optical fiber ribbon or an optical fiber bundle loosely contained within a central tube. Optical fiber ribbons are typically preferred where high fiber counts are required, such as feeder and distribution segments of an optical fiber network. They are also used to connect locations separated by long distances, referred to as long haul applications, such as connecting central telephone stations to local networks. Such cables could also be used in cable TV networks or as data links between computers. In U.S. Pat. No. 5,509,097, described above, the central tube loosely contains an optical fiber ribbon.

Optical fiber cables are also available comprising a plurality of tubes, each containing a plurality of optical fibers in a loose configuration and disposed around a central strength member to resist thermal expansion and contraction. Further strength members can also be provided in an outer protective jacket. Such cables are typically used where the ability to splice to different local points is required. For higher fiber count applications, optical fiber ribbons can be disposed in each of the tubes. See, for example, U.S. Pat. No. 5,229,851.

Optical fiber cables have been proposed which include both a central tube containing optical fibers for long haul applications and a plurality of outer tubes containing optical fibers for shorter distance connections. U.S. Pat. No. 4,822,132, to Oestreich, for example, discloses an optical communications cable for use in local cable networks comprising an inner central tube surrounded by a plurality of smaller tubes, each containing fewer optical fibers than the central tube. The outer tubes are stranded about the central tube in an alternating twist or reverse oscillating lay configuration. The outer tubes are accessible for splicing and branching while the central tube can continue through branching locations to cable terminals. No strength member system is provided to resist longitudinal forces, such as the forces due to installation and thermal expansion and contraction.

U.S. Pat. No. 4,230,395 to Dean et al., discloses an optical fiber cable comprising a plurality of optical fibers loosely contained within a plurality of tubes, surrounded by a sheath. A central tube containing optical fibers can also be provided, and is surrounded by the plurality of non-stranded tubes. Reinforcing members extending parallel to the cable axis are embedded in the sheath, in the tube walls, or can be between the plurality of tubes and the sheath but spaced from the central tube. Thus, the reinforcing members do not resist longitudinal expansion and contraction of the central tube.

U.S. Pat. No. 4,078,853 to Kempf et al., discloses an optical fiber cable comprising a plurality of tubes, each loosely containing an optical fiber ribbon, helically stranded around a central tube, also containing an optical fiber ribbon. An outer jacket reinforced with strength members surrounds the tubes.

However, none of the references cited hereinbefore suggests that when outer tubes containing optical fibers are disposed around a central tube containing optical fibers, structural strength members should be placed between the outer tubes and in contact with the central tube or that the outer tubes with the structural strength members therebetween should be wound around the central tube. It is unexpected that such a configuration would provide better protection for the optical fibers contained within the outer tubes and the central tube from thermal expansion and contraction, because the strength members are not substantially rectilinear and parallel with the cable axis, as in the prior art.

SUMMARY OF THE INVENTION

In accordance with one embodiment of the present invention, a combination optical fiber cable comprises a central tube containing at least one optical fiber and a plurality of outer tubes surrounding the central tube, each of the outer tubes containing at least one optical fiber. A sheath surrounds the outer tubes. At least two longitudinal structural members are between the central tube and the sheath. The structural members and outer tubes are wound about the central tube and the structural members engage the central tube. A cord is preferably wound about the outer tubes and structural members. Preferably the structural members and outer tubes are wound in a reverse oscillating lay configuration. The central tube preferably contains a plurality of optical fiber ribbons each containing optical fibers and the outer tubes preferably contain a plurality of individual loose optical fibers, i.e., optical fibers which are not bonded to each other, such as by way of encapsulation in a plastic. However, the fibers can be tightly buffered within the outer tubes. The structural members can comprise metallic or dielectric materials. Longitudinal strength members can also be embedded within the sheath. The optical fibers, both the individual fibers and the fiber containing ribbons, can be loosely contained within the central and outer tubes. One or more of the outer tubes, but not all the outer tubes, can contain a coaxial cable or copper pair instead of optical fibers.

DESCRIPTION OF THE INVENTION

Figure 1:
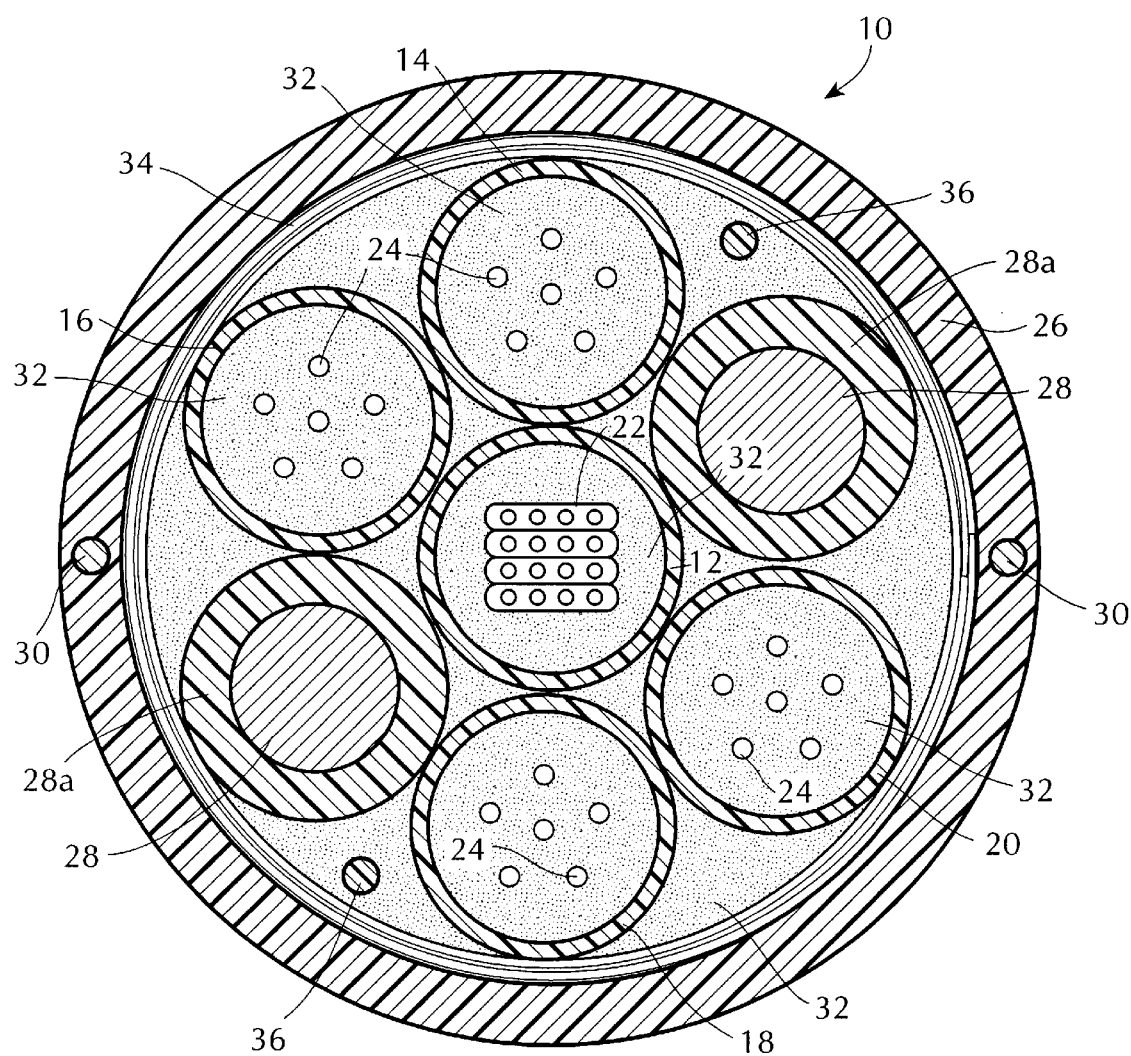
FIG. 1 is a cross-sectional view of a combination optical fiber cable 10 in accordance with one embodiment of the present invention.

FIG. 1 is a cross-sectional view of a combination optical fiber cable 10 in accordance with one embodiment of the present invention, comprising a central tube 12 containing at least one optical fiber and a plurality of outer tubes 14, 16, 18 and 20 disposed around the central tube 12, each of which also contains at least one optical fiber. The tubes 12, 14, 16, 18 and 20 can contain a single optical fiber, a plurality of separate optical fibers, an optical fiber ribbon, or an optical fiber bundle. Preferably, as shown in FIG. 1, a plurality of optical fiber ribbons 22 are contained within the central tube 12, and a plurality of individual optical fibers 24 not bonded to each other, are contained within four outer tubes 14, 16, 18 and 20. Six optical fibers 24 are shown in each of the outer tubes 14, 16, 18 and 20 for illustrative purposes only, but the number of fibers can be more or less. The tubes 12, 14, 16, 18 and 20 have inner diameters selected so that the cross-sectional area of the bores of the tubes are greater than the cross-sectional area of the optical fiber, plurality of fibers, or ribbons contained therein so that the optical fiber or fibers and ribbons are loosely contained, therein. A sheath 26 surrounds the outer tubes. The fibers and ribbons are of any known type, the ribbons comprising a planar array of fibers encapsulated in a plastic. Any or all of the outer tubes 14, 16, 18 and 20 can have inner diameters such that the cross-sectional area of the bores of the tubes are essentially the same as the cross-sectional area of the optical fiber, plurality of fibers, or ribbons contained therein, as well. Such a configuration is referred to as tight buffered fibers.

At least two structural strength members 28 are provided between the central tube 12 and the sheath 26, between the outer tubes 14, 16, 18 and 20. The structural strength members 28 can be made of any high tensile modulus material, e.g., a non-metallic material, such as glass, epoxy rods, graphite yarns or a metallic material, such as stainless steel or carbon steel coated with copper or zinc to prevent corrosion. The coefficient of thermal expansion of the strength members 28 is less than that of the central tube 12 and outer tubes 14, 16, 18 and 20 and the tensile modulus of the strength members is higher than the tensile modulus of such tubes. The structural strength members 28 are shown covered by an optional covering 28a, such as polyethylene, for example, but the covering 28a can be omitted, particularly if the strength member is non-metallic. The diameter of the strength member 28 is preferably no greater than that required to provide the desired protection. When the strength member 28 is metallic, the diameter of the strength member 28 is typically less than the diameter of the outer tubes 16. The thickness of the covering 28a is preferably about equal to the difference between the diameter of the strength member 28 and the diameter of the outer tube 16.

The central tube 12 preferably comprises a plastic material, such as high density polyethylene ("HDPE"). The outer tubes 14, 16, 18 and 20 also preferably comprise a plastic material, such as polybutylene terephtalate ("PBT") or HDPE. Other suitable plastic materials for the inner and outer tubes include polypropylene, polyvinylchloride and polymethylpentene. The plastic materials for the central and outer tubes preferably have a Young's Modulus in the range of from 20,000 to 500,000 psi. The central and outer tubes can also be metallic or composite materials, such as an epoxy mixed with glass fibers. The sheath 26, which is also, preferably, a plastic material, may be medium density polyethylene ("MDPE"), for example.

Preferably, two diametrically opposed longitudinal strength members 30 extending substantially parallel to the axis of the cable 10 are embedded in the sheath 26. The longitudinal strength members can be steel, for example, as is known in the art. The longitudinal strength members 30 in the sheath 26 protect the optical fibers from longitudinal stresses such as pulling during installation. If the cable 10 is intended to be used in applications which do not require pulling during installation, such as cables to be installed by the "blown-in" technique, strength members in the sheath may not be necessary. The strength members 30 also allow bending of the cable perpendicular to the plane containing the two strength members 30.

Preferably, a water blocking material 32 is provided within the central tube 12, within the outer tubes 14, 16, 18 and 20, and in the open spaces between the central tube 12, outer tubes 14, 16, 18 and 20 and the sheath 26. The water blocking material 32 within the outer tubes 14, 16, 18 and 20 can be a thixotropic grease or gel, preferably with a viscosity at 20 seconds$^{-1}$ in the range of from 8,000 to 25,000 cps. at 25° C. Preferably, the water blocking material in the open spaces between the sheath 26 and the central tube 12, outside the outer tubes 14, 16, 18 and 20, is a thixotropic grease or gel having viscosity in the range of from 10 to 500 cps. at 125° C., in accordance with ASTM D-2699. The water blocking material preferred within the buffer tubes 14, 16, 18 and 20, discussed above, can be used in the open spaces outside of the tubes, as well. The material can contain small particles, preferably of a size less than about 500 microns, of a known water swellable material, such as sodium acrylate, to assist in preventing moisture from affecting the optical fibers. In addition, or in the alternative, compounds for absorbing gas, such as hydrogen, may also be provided for assisting in protecting the optical fibers from deleterious gases.

Figure 5:
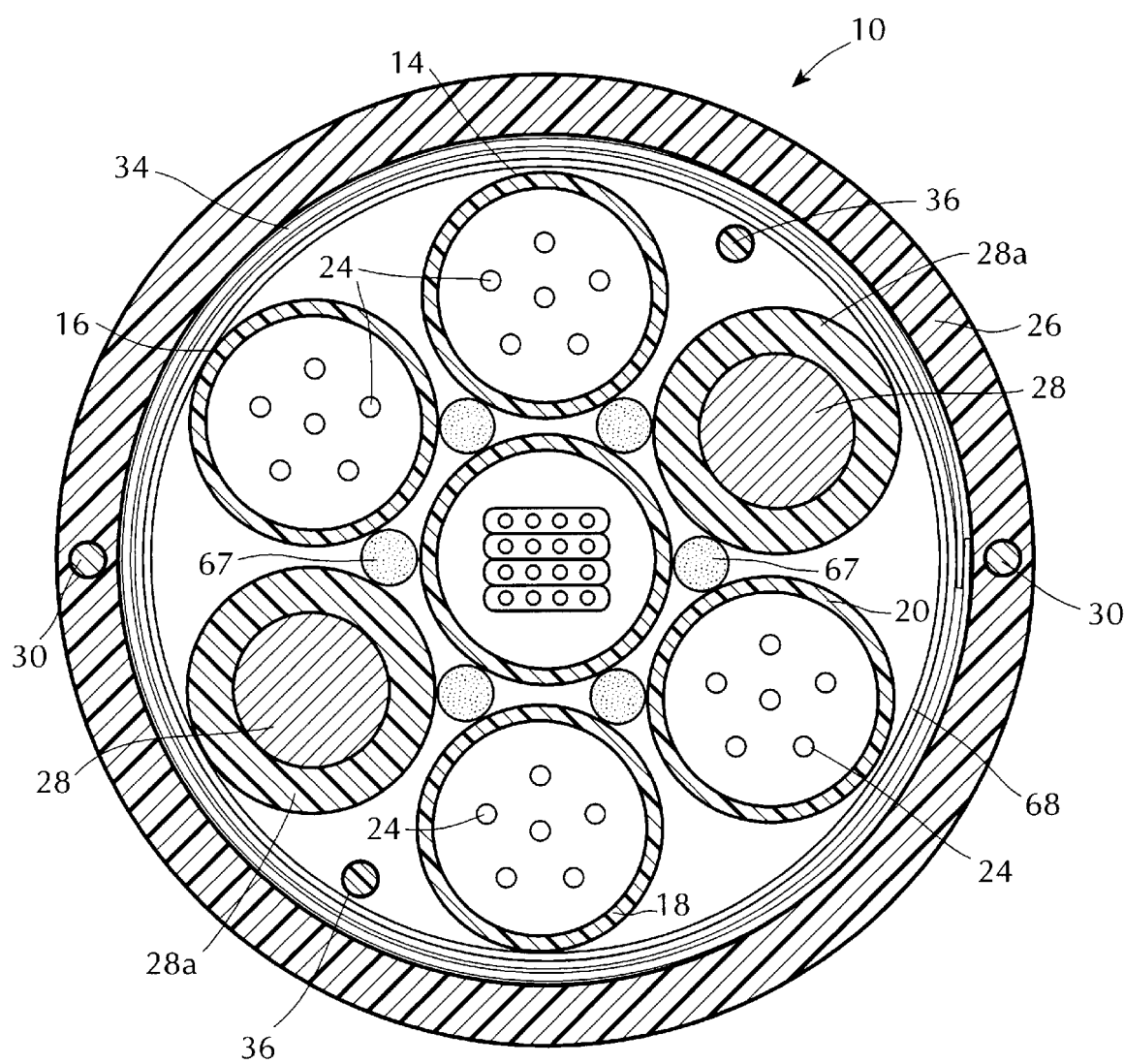
FIG. 5 is a cross-sectional view of a modification of the embodiment shown in FIG. 1 in which the water blocking material outside the tubes is replaced by a dry water swellable yarn or tape.

Alternatively, and in place of a water blocking material 32, a known type of water swellable yarn 67 can be stranded with the outer tubes 14, 16, 18 and 20 as shown in FIG. 5. Instead of the yarn 67, or in addition thereto, a known type of water swellable tape 68 can be wound around the outer tubes.

A layer of corrugated steel armor 34 is optionally provided around the outer tubes 14, 16, 18 and 20, and the tape 68, if present, adjacent to the inner surface of the sheath 26, to provide additional protection against crushing and rodents, for example. The armor 34 can be of the type described in U.S. Pat. No. 5,509,097, which is incorporated by reference, herein.

Preferably, one or more ripcords 36 extending generally parallel to the axis of the cable 16 are also provided adjacent the inner surface of the sheath 26 or the inner surface of the corrugated steel armor 34, if provided, to ease opening of the sheath 26, or the armor 34 and the sheath 26 when access to the tubes is required. Two ripcords 36 are shown in FIGS. 1 and 5, although one or more than two can be included. The ripcords may be aramid, for example.

Figure 2:
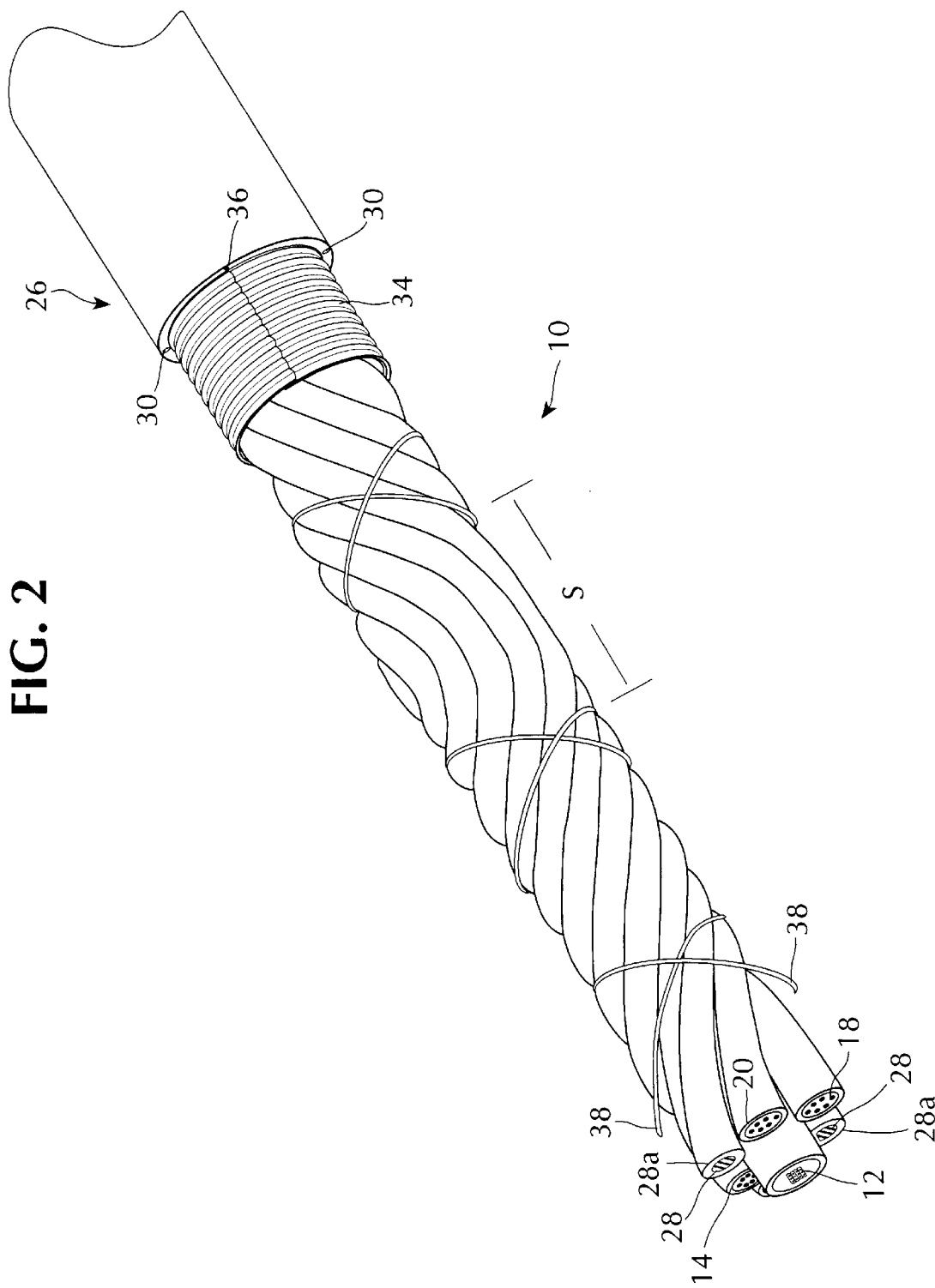
FIG. 2 is a perspective view of the combination cable of FIG. 1, with its sheath and armoring partially removed.

In accordance with the present invention, the outer tubes 14, 16, 18 and 20 and strength members 28 are engaged with the central tube 12, as shown in the perspective view of the combination cable 10 of the present invention in FIG. 2. In FIG. 2, the sheath 26 and the armor 34 are partially removed. The outer tubes and the strength member 28 are preferably wound in a reverse oscillating lay configuration. A cord 38 of polyester, nylon, aramid or fiberglass, for example, is preferably tied around the outer tubes 14, 16, 18 and 20 and strength members 28, to more tightly couple the outer tubes and strength members to each other and to the central tube 12. The cord can be in the form of a monolithic fiber, a thread or a yarn. The cord 38 applies radial inward forces to the structural strength members 28 and the outer tubes 14, 16, 18 and 20, maintaining the contact between the strength members, outer tubes and the central tube 12, to resist contraction or expansion of the tubes and buckling of the tubes caused by longitudinal forces on the tubes. The cord 38 is preferably wound under tension, in the range of from about 200 grams to about 2,000 grams, for example. Preferably, the tension is in the range of from 600 to 1500 grams. The diameter of the cord is preferably less than about 2 mm. Its tensile strength at break is at least about 6,000 psi. Instead of a cord 38, a tape, such as a commercially available polyester type with a tensile strength of about 6,000 psi, may be used. The tape may have a thickness of about 0.020 mm to about 0.030 mm, and a width preferably less than about 1 inch, for example.

In the reverse oscillating lay configuration, the outer tubes and the strength members are wound first in one direction around the central tube 12, and then wound in the opposite direction. Between the oppositely wound sections is a section "S" wherein the outer tubes 14, 16, 18 and 20 are parallel to each other and substantially parallel to the axis of the central tube 12. This is the preferred section for carrying out splices with the optical fiber in the outer tubes.

It has been found that winding the strength members 28 with the outer tubes 14, 16, 18 and 20 provides better coupling between the strength members 28, the outer tubes 14, 16, 18 and 20 and the central tube 12, providing better resistance to thermal expansion and contraction of the outer tubes and the central tube. Binding the outer tubes and strength members to the central tube through a cord 38 further strengthens the coupling between the outer tubes, strength members and the central tube, further improving the resistance of the outer tubes and central tube to thermal expansion and contraction and to buckling. The combination optical fiber cable of the present invention can operate over a temperature range of from about −40° C. to about 70° C. and preferably, over a temperature range of about −50° C. to about 90° C.

Figure 3:
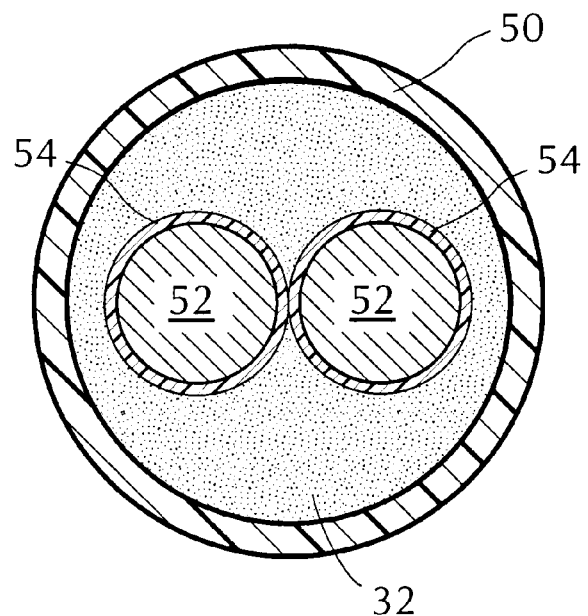
FIG. 3 is a cross-sectional view of an outer tube containing a twisted copper pair.
Figure 4:
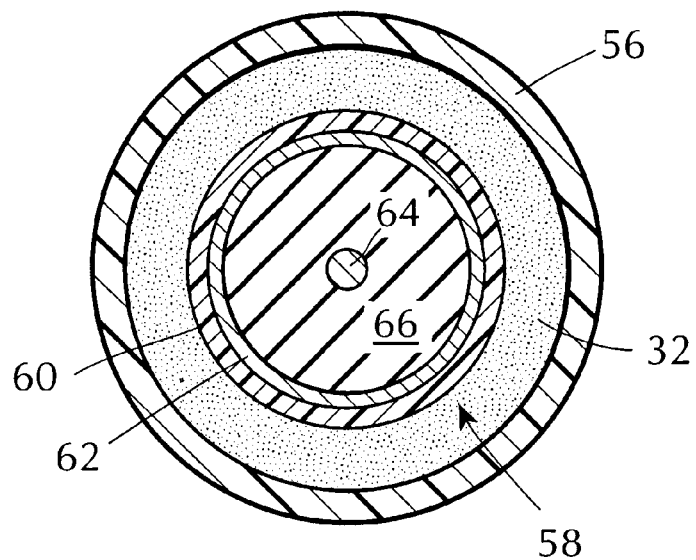
FIG. 4 is a cross-sectional view of an outer tube containing a coaxial cable.

A twisted copper pair or a coaxial cable may be substituted for one or more, but not all, tubes containing optical fibers. FIG. 3 is a cross-sectional view of an outer tube 50, which can replace one of the tubes 14, 16, 18 and 20, containing a twisted pair of electrically conductive copper wires 52, each of which is surrounded by insulation 54. FIG. 4 is a cross-sectional view of another outer tube 56, which can replace one of the tubes 14, 16, 18 and 20, containing a coaxial cable 58. A typical coaxial cable includes an outer insulation layer 60, an outer conductor 62, an inner conductor 64 and insulation 66 between the outer and inner conductors 62, 64, as is known in the art. While water blocking material 32 can be included in the tubes 50 and 56, it can be omitted. The twisted copper pair 52 or coaxial cable 58 need not be provided in a tube.

The combination optical fiber cable of the present invention can be used wherever it is advantageous to provide a plurality of optical fibers to a plurality of locations. The cable of the present invention is particularly suitable wherever it would be advantageous to provide express fibers for connecting relatively distant locations and enterable fibers for splicing to points between the distant locations, in the same cable. For example, in trunking/interoffice applications, low speed loop fibers may be desired along the same route as high speed interoffice links. With the preferred combination optical fiber cable of the present invention, the high speed interoffice links can be provided through an optical fiber ribbon in the central tube while the low speed loop fibers can be provided in the outer tubes. The optical fibers in the outer tubes can be easily accessed and spliced at Add/Drop remote terminal sites without disturbing the high-speed links.

The combination optical fiber cable of the present invention also provides the flexibility to accommodate unanticipated or indefinite needs, such as those which typically arise in the construction of communities, particularly communities which may not have defined lot lines, or in areas of high potential growth. With the cable of the present invention, whenever connection to a new building or terminal is required, the optical fibers in the outer tubes of the cable can be easily accessed for splicing, while the central tube remains sealed.

Cables of the present invention provided along undeveloped rights of way are also readily available for fiber to the home ("FTTH") applications. As development occurs, the new buildings can be spliced into the optical fibers of the outer tubes of the cable of the present invention.

Pole mounted personal communications service ("PCS") antennas, e.g., cellular optical sites, could also be coupled to networks with the combination cables in accordance with the present invention. As cell sites spread, antennas may be required in locations which were not originally anticipated. If the cables of the present invention are servicing standard broadband or interoffice applications in the area through the central tube, the optical fibers in the outer tubes are available for splicing to future antenna nodes.

The combination cable disclosed also enables the separation of long distance and local service links for administrative or regulatory reasons such that long distance telephone service can be provided through the central tube while local service can be provided through the outer tubes. Broadcast and digital interactive services could similarly be separated.

Although preferred embodiments of the present invention have been described and illustrated, it will be apparent to those skilled in the art that various modifications may be made without departing from the principles of the invention.

We claim:

1. An optical fiber cable comprising:
    a central tube loosely containing at least one optical fiber;
    a plurality of outer tubes, at least one of said outer tubes containing at least one optical fiber, and at least two structural strength members having a tensile modulus which is high relative to the tensile modulus of said central tube and having a temperature coefficient of expansion less than the temperature coefficient of expansion of said central tube, said outer tubes and said strength members being disposed around said central tube in a reverse oscillating lay configuration and with said strength members in contact with said central tube, said structural strength members being spaced from each other in the circumferential direction of said central tube and intermediate pairs of said outer tubes, wherein said strength members are coupled to said central tube and have a tensile strength and resistance to compression sufficient to protect the optical fibers in the central tube with respect to contraction or expansion upon application of longitudinal forces on the cable; and a sheath encircling said outer tubes and said structural strength members.

2. The optical fiber cable of claim 1 wherein said central tube contains a plurality of optical fibers in a ribbon.

3. The optical fiber cable of claim 2 wherein each of said outer tubes contains a plurality of individual fibers.

4. The optical fiber cable of claim 1 further comprising a binding means under tension wrapping said outer tubes and said structural strength members for urging said outer tubes and said structural strength members toward said central tube and resisting movement of said outer tubes and said structural strength members away from said central tube.

5. The optical fiber cable of claim 4, wherein the binding means is a cord and wherein the cord is under tension in the range of from about 200 grams to about 2000 grams.

6. The optical fiber cable of claim 4, wherein the binding means is a cord or tape having a tensile strength at break of about 6000 psi.

7. The optical fiber cable of claim 1 wherein said structural strength members are made of metal.

8. The optical fiber cable of claim 7, wherein said metal is selected from the group consisting of stainless steel and carbon steel.

9. The optical fiber cable of claim 1 wherein said structural strength members are made of non-metallic material.

10. The optical fiber cable of claim 9, wherein said non-metallic material is selected from the group consisting of glass, epoxy rods and graphite yarns.

11. The optical fiber cable of claim 1 further comprising a metal armor encircling said outer tubes and said structural strength members, said metal armor being between said sheath and said outer tubes and said structural strength members.

12. The optical fiber cable of claim 11 wherein said metal armor is corrugated.

13. The optical fiber cable of claim 11 further comprising a rip cord between said metal armor and said outer tubes and said structural strength members for severing said metal armor and said sheath longitudinally thereof with pulling of said rip cord transversely to the axis of said cable.

14. The optical fiber cable of claim 13 wherein the central tube and the plurality of outer tubes each have bores with cross-sectional areas greater than the cross-sectional areas of the optical fiber therein.

15. The optical fiber cable of claim 1 further comprising moisture protection means for reducing the effects of moisture in said cable.

16. The optical fiber cable of claim 15 wherein said moisture protection means comprises a water blocking material in said central tube, said outer tubes and otherwise empty spaces within said sheath.

17. The optical fiber cable of claim 15 wherein said moisture protection means comprises a water swellable yarn within said sheath and extending longitudinally of said cable.

18. The optical fiber cable of claim 15 wherein said moisture protection means comprises a water swellable tape encircling said outer tubes and said structural strength members and intermediate said sheath and said outer tubes and said structural strength members.

19. The optical fiber cable of claim 1 further comprising structural strength members embedded in said sheath and extending generally parallel to the axis of said cable.

20. The optical fiber cable of claim 1 further comprising a further tube intermediate a pair of said outer tubes in the circumferential direction of said central tube, said further tube containing an electrical conductor.

21. The optical fiber cable of claim 20 wherein said electrical conductor is electrically insulated and is one of a pair of electrically insulated conductors.

22. The optical fiber cable of claim 20 wherein said electrical conductor is encircled by insulation which in turn is encircled by an electrically conductive layer.

23. The optical fiber cable of claim 1, wherein the central tube and the outer tubes are tubes of plastic material.

24. The optical fiber cable of claim 1, wherein the at least one outer tube containing the at least one optical fiber comprises a plurality of optical fibers and wherein the optical fibers in the at least one outer tube are not bonded to each other.

25. An optical fiber cable comprising:

a central tube loosely containing at least one optical fiber;

a plurality of outer tubes, at least one of said outer tubes loosely containing at least one optical fiber, and at least two structural strength members having a high tensile modulus which is high relative to the tensile modulus of said central tube and having a temperature coefficient of expansion less than the temperature coefficient of expansion of said central tube, said outer tubes and said strength members being disposed around said central tube in a reverse oscillating lay configuration and engaging said central tube, said structural strength members being spaced from each other in the circumferential direction of said central tube and intermediate pairs of said outer tubes, wherein said strength members are coupled to said central tube and have a tensile strength and resistance to compression sufficient to protect the optical fibers in the central tube with respect to contraction or expansion upon application of longitudinal forces on the cable; and a sheath encircling said outer tubes and said structural strength members.

26. The optical fiber cable of claim 25 further comprising a further tube intermediate a pair of said outer tubes in the circumferential direction of said central tube, said further tube containing an electrical conductor.

27. The optical fiber cable of claim 25 further comprising a binding means under tension wrapping said outer tubes and said structural strength members for urging said outer tubes and said structural strength members toward said central tube and resisting movement of said outer tubes and said structural strength members away from said central tube.

28. The optical fiber cable of claim 27, wherein the binding means is a cord and wherein the cord is under tension in the range of from about 200 grams to about 2000 grams.

29. The optical fiber cable of claim 25, wherein the central tube and the outer tubes are tubes of plastic material.

* * * * *